United States Patent
Tanabe (10) Patent No.: US 8,601,293 B2
(45) Date of Patent: Dec. 3, 2013

(54) RECORDING/REPRODUCTION APPARATUS, AND POWER SUPPLY CONTROL METHOD OF VIDEO SERVER AND RECORDING/REPRODUCTION APPARATUS

(75) Inventor: Osamu Tanabe, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 677 days.

(21) Appl. No.: 12/841,583

(22) Filed: Jul. 22, 2010

(65) Prior Publication Data

US 2011/0023075 A1   Jan. 27, 2011

(30) Foreign Application Priority Data

Jul. 23, 2009  (JP) ................. 2009-172357

(51) Int. Cl.
*G06F 1/00* (2006.01)
(52) U.S. Cl.
USPC ............... 713/310; 713/323; 713/324
(58) Field of Classification Search
USPC ............ 713/300, 310, 323, 324, 340
See application file for complete search history.

(56) References Cited

U.S. PATENT DOCUMENTS

| | | | | |
|---|---|---|---|---|
| 6,363,212 | B1* | 3/2002 | Fujinami et al. | 386/338 |
| 7,386,742 | B2* | 6/2008 | Hirai | 713/300 |
| 7,437,577 | B2* | 10/2008 | Obara et al. | 713/300 |
| 7,992,026 | B2* | 8/2011 | Eade et al. | 713/324 |
| 8,280,234 | B2* | 10/2012 | Tanabe | 386/343 |
| 2004/0019813 | A1* | 1/2004 | Kobayashi | 713/300 |
| 2004/0158748 | A1* | 8/2004 | Ishibashi et al. | 713/300 |
| 2005/0060588 | A1* | 3/2005 | Araki | 713/300 |
| 2006/0195709 | A1* | 8/2006 | Matsumoto | 713/300 |

FOREIGN PATENT DOCUMENTS

| | | |
|---|---|---|
| JP | 2002-319956 | 10/2002 |
| JP | 2006-262007 | 9/2006 |
| JP | 2007-184026 | 7/2007 |
| WO | WO2007/026615 | 3/2007 |

OTHER PUBLICATIONS

Office Action mailed on Aug. 23, 2011 in Japanese Patent Application No. 2009-172357.

* cited by examiner

*Primary Examiner* — Khanh Dang
(74) *Attorney, Agent, or Firm* — Finnegan, Henderson, Farabow, Garrett & Dunner, LLP (57) ABSTRACT

According to one embodiment, a recording/reproduction apparatus includes a power source controller. The power source controller includes a determination unit, a stand-by mode execution unit, and a pause mode execution unit. The determination unit determines whether or not an event associated with at least one of recording and reproduction of the information signal occurs at start-up time. The stand-by mode execution unit executes a stand-by mode in which the power level of each of the encoder, the decoder, the recording medium, and the plurality of signal processors is controlled to be lower than a predetermined level. The pause mode execution unit executes a pause mode in which the power to each of the encoder, the decoder, the recording medium, and the plurality of signal processors is turned off, and the power level of the process controller is controlled to be lower than the predetermined level.

7 Claims, 9 Drawing Sheets

| Server main body status | CPU unit | Encoder unit | Memory unit | Decoder unit | Clock generation unit | Power source unit |
|---|---|---|---|---|---|---|
| Power ON | Power ON (Level 3) | Power ON (Level 3) | Power ON (Level 3) | Power ON (Level 3) | Power ON (Level 3) | Power ON (Level 3) |
| Recording | Power ON (Level 3) | Power ON (Level 3) | Power ON (Level 3) | Power ON (Level 2) | Power ON (Level 3) | Power ON (Level 2) |
| Delivery | Power ON (Level 3) | Power OFF | Power ON (Level 3) | Power ON (Level 3) | Power ON (Level 3) | Power ON (Level 2) |
| Standby | Power ON (Level 3) | Power ON (Level 1) | Power ON (Level 1) | Power ON (Level 1) | Power ON (Level 1) | Power ON (Level 1) |
| Pause | Power ON (Level 1) | Power OFF | Power OFF | Power OFF | Power OFF | Power ON (Level 1) |
| ⋮ | ⋮ | ⋮ | ⋮ | ⋮ | ⋮ | ⋮ |

RECORDING/REPRODUCTION APPARATUS, AND POWER SUPPLY CONTROL METHOD OF VIDEO SERVER AND RECORDING/REPRODUCTION APPARATUS

CROSS-REFERENCE TO RELATED APPLICATIONS

This application is based upon and claims the benefit of priority from Japanese Patent Application No. 2009-172357, filed Jul. 23, 2009; the entire contents of which are incorporated herein by reference.

FIELD

Embodiments described herein relate generally to a video server configured to store a delivery contents data of a broadcast program and, more particularly, to a power-supply control method of a video server and recording/reproduction apparatus.

BACKGROUND

As is generally known, a broadcast program distribution system is configured in such a manner that delivery contents data of broadcast programs are stored in advance in a video server, and a corresponding contents data is reproduced and delivered toward transmitter or other equipment in accordance with an instruction from an broadcast program distribution controller.

Incidentally, the video server has been operated, even in a state where neither a recording operation nor a reproduction operation (mainly called as playing in broadcast application) is carried out, in a full-power state at all times for 24 hours continuously 365 days for about 10 years. Consequently, the video server itself has been consuming the rated power consumption at all times. By the consumption of power, in the server as an apparatus, heat is generated at all times, and hence the fan is continuously rotated. The discharged waste heat rises the temperature in the room, and an air conditioner keeps running on at all times to prevent the temperature rise. Thus, the air conditioner also consumes the power.

It should be noted that as an associated prior art of this type, the configuration, in a home gateway apparatus, in which power control is carried out for each current-carrying unit to thereby realize low power consumption is shown in Jpn. Pat Appln. KOKAI Publication No. 2002-319956. However, the configuration described in Jpn. Pat Appln. KOKAI Publication No. 2002-319956 is that configured, in the home gateway apparatus, to switch the power source of each of systems to be connected to the different Internets between a current-carrying state and non-current-carrying state, and is not associated with the video server to be used for the broadcast program distribution system.

As described above, with the video server, effective means for realizing low power consumption even in an operative state has been strongly desired.

DETAILED DESCRIPTION

In general, according to one embodiment, a recording/reproduction apparatus includes an encoder, a decoder, a plurality of signal processors, a process controller and a power source controller. The encoder is configured to encode an information signal to generate encoded data, and write the encoded data on a recording medium, to record the information signal. The decoder is configured to read out the encoded data from the recording medium, and to decode the encoded data, to reproduce the information signal. The plurality of signal processors are connected to the encoder and the decoder through an internal bus, and configured to execute signal processing associated with the encoding of the information signal or the decoding of the encoded data. The process controller is connected to the encoder, the decoder, and the plurality of signal processors through the internal bus, and configured to generally control the signal processing of each unit in a unified manner. The power source controller is configured to control the power level of each of the encoder, the decoder, the recording medium, the plurality of signal processors, and the process controller. The power source controller includes a determination unit, a stand-by mode execution unit, and a pause mode execution unit. The determination unit is configured to determine whether or not an event associated with at least one of recording and reproduction of the information signal occurs at start-up time. The stand-by mode execution unit is configured to execute a stand-by mode in which the power level of each of the encoder, the decoder, the recording medium, and the plurality of signal processors is controlled to be lower than a predetermined level, when no event occurs as a result of the determination carried out by the determination unit. The pause mode execution unit is configured to execute a pause mode in which the power to each of the encoder, the decoder, the recording medium, and the plurality of signal processors is turned off, and the power level of the process controller is controlled to be lower than the predetermined level, when no event occurs within a preset time during the execution of the stand-by mode.

Figure 1:
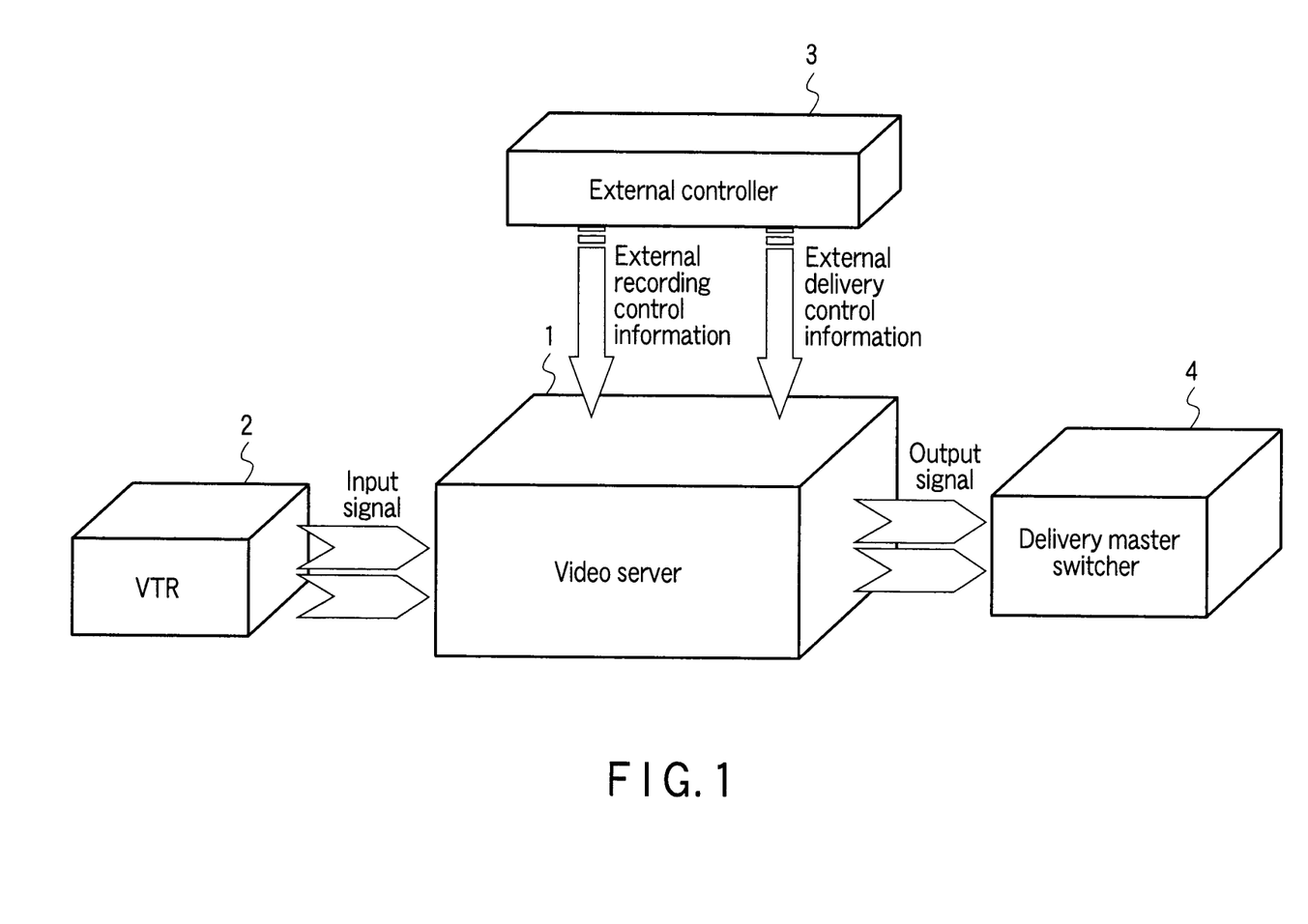
FIG. 1 is a block diagram showing the configuration of a broadcast program distribution system which is an embodiment.

FIG. 1 is a block diagram showing the configuration of a broadcast program distribution system which is an embodiment. In FIG. 1, a video server 1 is an apparatus configured to encode and store a contents data of a broadcast program to be delivered by specified output from, for example, a Video Tape Recorder (VTR) 2, and carries out recording or reproduction of a corresponding contents data according to external recording control information or external delivery control information supplied thereto from an external controller 3.

The reproduced data is lead to, for example, a delivery master switcher 4, and is selectively output to be put on the air.

Figure 2:
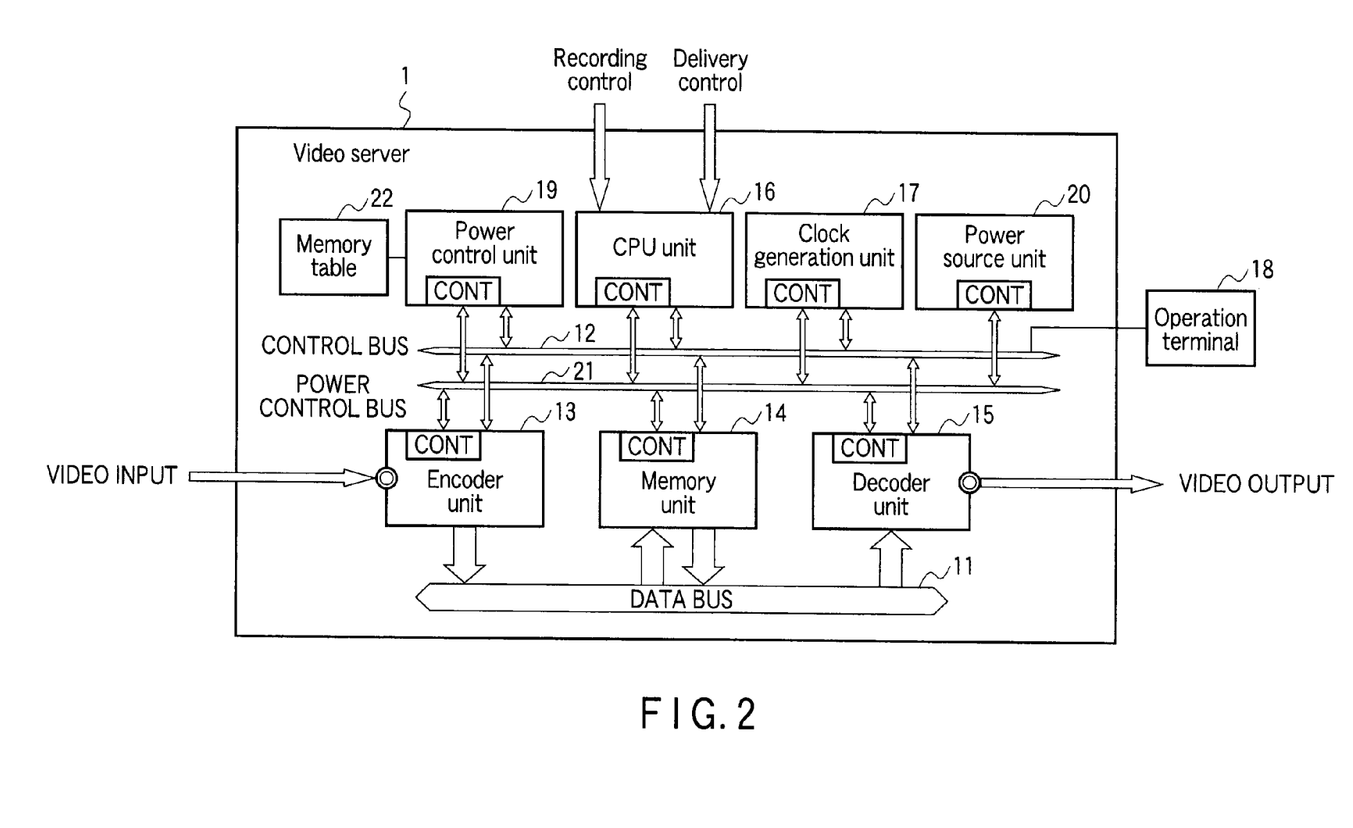
FIG. 2 is a block diagram showing the specific configuration of a video server as a recording/reproduction apparatus.

FIG. 2 is a block diagram showing the specific configuration of the video server 1. The video server 1 includes a data bus 11, and control bus 12. An encoder unit 13, memory unit 14, and decoder unit 15 are connected to the data bus 11. The encoder unit 13, memory unit 14, decoder unit 15, a CPU unit 16, clock generation unit 17, operation terminal 18, and power control unit 19 are connected to the control bus 12. It should be noted that as the memory unit 14, a flash memory hardly consuming power is used.

That is, the contents data (output) from the Video Tape Recorder (VTR) 2 is encoded by the encoder unit 13, and is written to the memory unit 14 through the data bus 11. Further, the encoded data reproduced from the memory unit 14 is decoded by the decoder unit 15 into the original contents data, i.e., the video signal through the data bus 11, and is output to the delivery master switcher 4.

On the other hand, the CPU unit 16 is a unit configured to carry out control of writing/reading the contents data to/from the memory unit 14 according to control information from the external controller 3 or operation input instruction of the operation terminal 18, and is also provided with a preview function, and control function for controlling the encoder unit 13, memory unit 14, decoder unit 15, CPU unit 16, clock generation unit 17, and power control unit 19. The clock generation unit 17 is a unit configured to generate a clock necessary for control of writing/reading the contents data.

Figure 3:
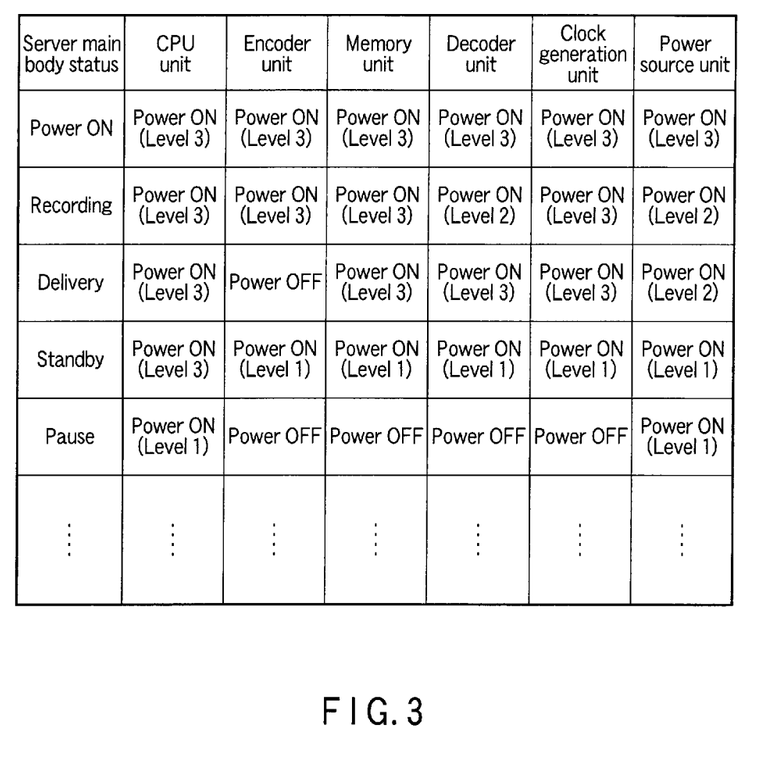
FIG. 3 is a table showing an example of the storage contents of a memory table shown in FIG. 2.

Further, the power control unit 19 is a unit connected to the encoder unit 13, memory unit 14, decoder unit 15, CPU unit 16, clock generation unit 17, and a power source unit 20 through a power control bus 21 independent of the data bus 11 and control bus 12, and configured to carry out control of the power level of each part according to a memory table 22. It should be noted that in the memory table 22, data indicating the correspondence relationship between the status of the video server 1 and power level to be set in each of the encoder unit 13, memory unit 14, decoder unit 15, CPU unit 16, clock generation unit 17, and power source unit 20 is stored as shown in FIG. 3. It should be noted that Level 1 is an output level at which minimal power for allowing instruction data from the host to be received, and enabling control to be carried out for each unit can be supplied, Level 2 is a power saving output level for carrying out only recording or delivery, and Level 3 is a power output level for supplying power at the full operation time at which recording and delivery are simultaneously carried out.

Next, the power control processing in the above-mentioned configuration will be described below.

Figure 4:
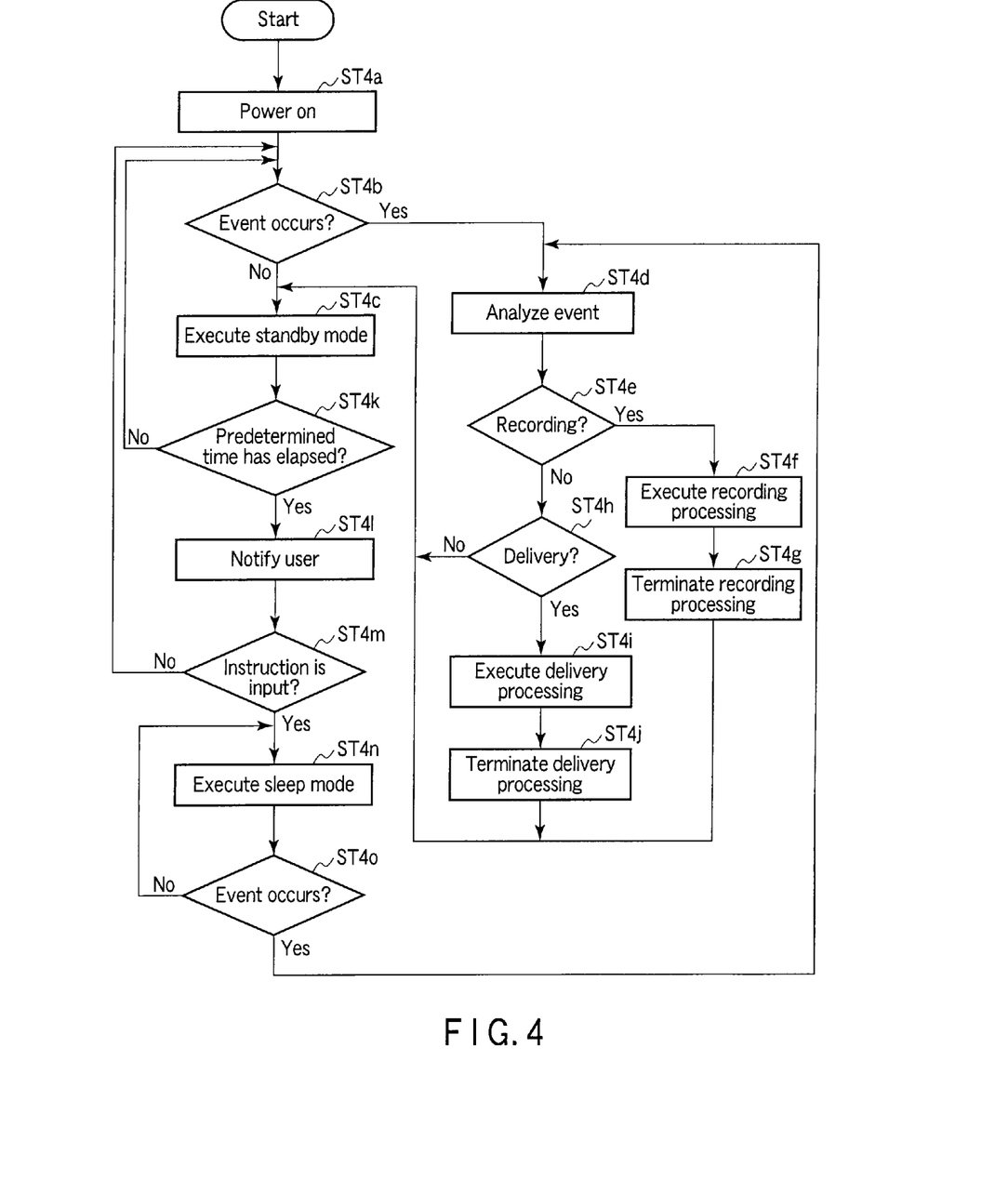
FIG. 4 is a flowchart showing the power control procedure of a power control unit in the embodiment.

FIG. 4 is a flowchart showing the power control procedure of the power control unit 19. First, when turning-on of the power is carried out from the operation terminal 18 (step ST4a), the power of each of the encoder unit 13, memory unit 14, decoder unit 15, CPU unit 16, clock generation unit 17, and power source unit 20 is set at Level 3 as shown in FIG. 5(a), and the status and operating state of the apparatus are acquired from each of the encoder unit 13, memory unit 14, decoder unit 15, CPU unit 16, clock generation unit 17, and power source unit 20 as shown in FIG. 5(b) to determine that the apparatus has normally been started.

Figure 5:
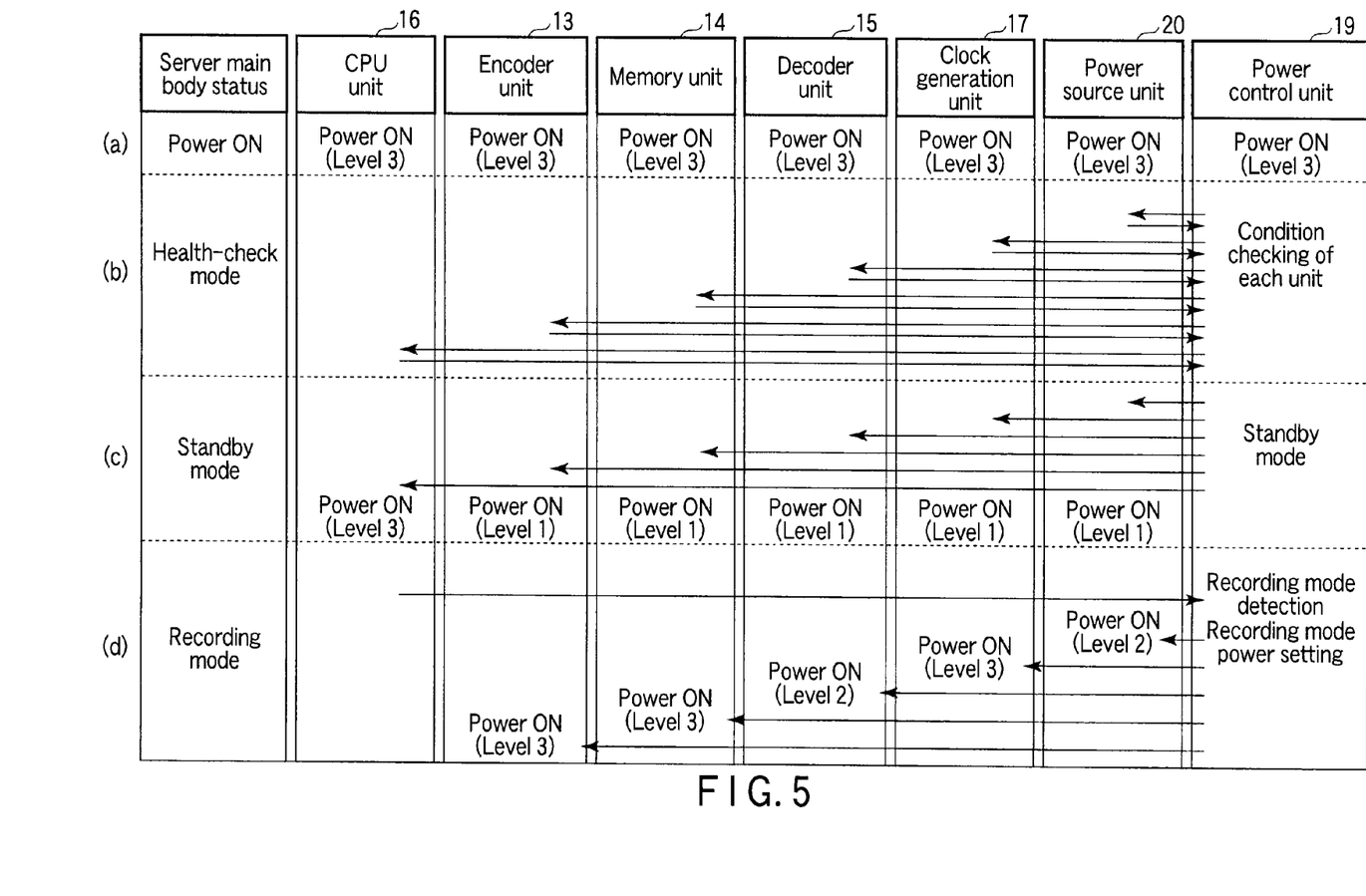
FIG. 5 is a sequence diagram shown to explain an information transmission/reception operation to be carried out between each unit at the time of turning-on of the power or recording in the embodiment.

Subsequently, the power control unit 19 determines whether or not an event associated with recording or delivery occurs (step ST4b), and when no event occurs (No), the flow is shifted to a stand-by mode, and the power level of each of the encoder unit 13, memory unit 14, decoder unit 15, clock generation unit 17, and power source unit 20 except the CPU unit 16 is lowered to Level 1 as shown in FIG. 5(c) (step ST4c). However, it is also possible to output only a BB signal to the decoder unit 15.

(At the Recording Time)

As shown in FIG. 5(d), when the CPU unit 16 receives a recording list from the host system such as external controller 3, the power control unit 19 is notified by the CPU unit 16 that recording is started, whereby the unit 19 shifts the state from step ST4b to step ST4d, in which the unit 19 determines that recording is to be carried out (step ST4e), and the flow enters into the recording mode (step ST4f). At this time, the encoder unit 13, memory unit 14, and clock generation unit 17 are set at the full-power (Level 3), and the decoder unit 15 and power source unit 20 are set at Level 2.

At this time, the CPU unit 16 encodes the contents data of all the programs described in the recording list by using the encoder unit 13, writes the encoded contents data onto the memory unit 14, specifies the contents data for each of the programs in the order of the programs put on the recording list, and parts to be reproduced are made to be read. The reproduced data is converted by the decoder unit 15 into a video signal, is sent to a monitor display (not shown), and is displayed thereon (preview (PV) reproduction). The CPU unit 16 repetitively executes the PV reproduction for all the programs described in the recording list, and when the execution is completed for all the programs, the CPU unit 16 notifies the power control unit 19 that the recording has been completed as shown in FIG. 6(b).

Upon receipt of the notification, the power control unit 19 shifts the state from step ST4g to step ST4c, in which the unit 19 enters the stand-by mode.

(At the Delivery Time)

Figure 6:
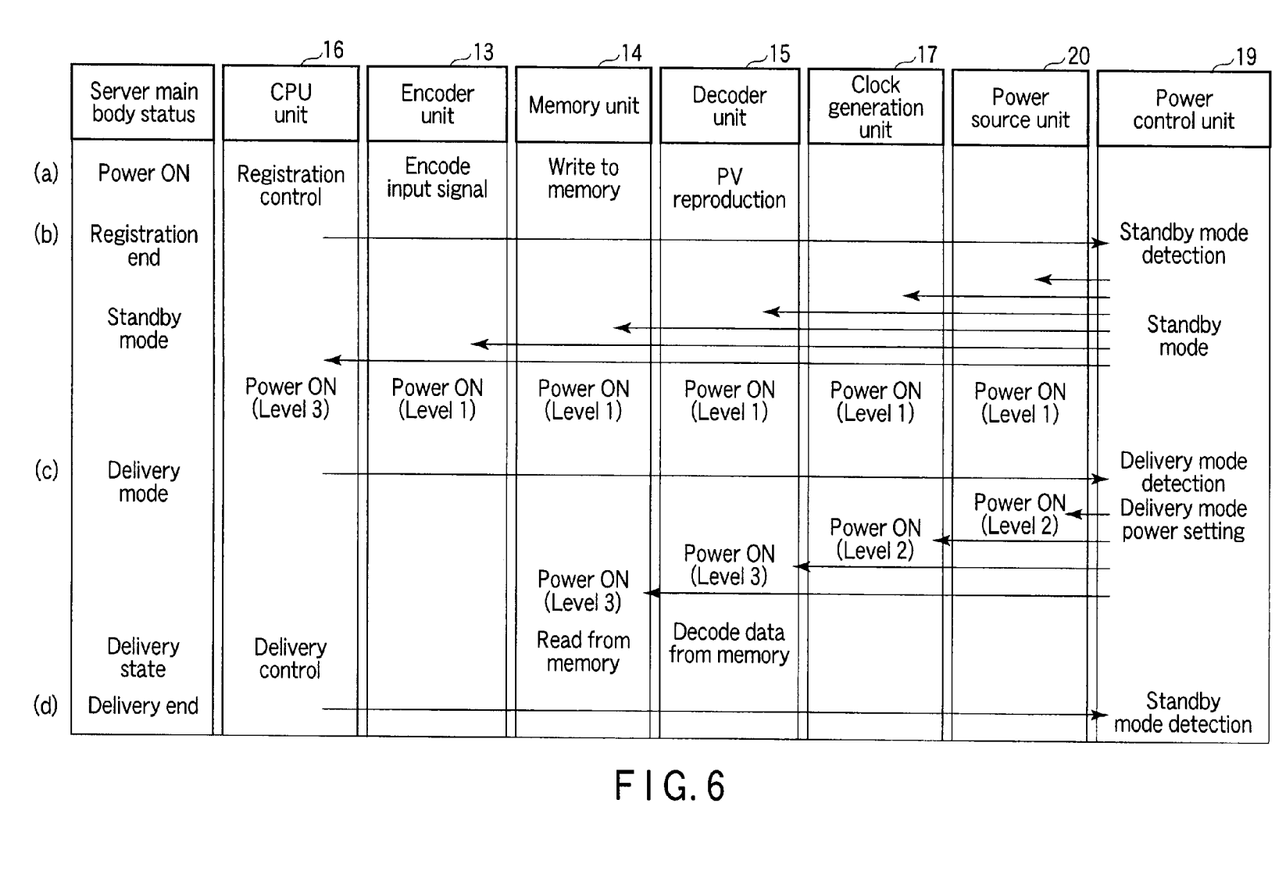
FIG. 6 is a sequence diagram shown to explain an information transmission/reception operation to be carried out between each unit at the time of delivery in the embodiment.

As shown in FIG. 6(c), when the CPU unit 16 receives a delivery list from the host system, the power control unit 19 is notified by the CPU unit 16 through the control bus 12 that delivery is started, whereby the unit 19 determines that delivery is to be carried out (step ST4h), and the flow enters the delivery mode (step ST4i). At this time, the memory unit 14, decoder unit 15, and clock generation unit 17 are set at the full-power (Level 3), and the power source unit 20 is set at Level 2. It should be noted that the encoder unit 13 is brought into the power-off state.

At this time, the CPU unit 16 reads the contents data of all the programs described in the delivery list from the memory unit 14. The CPU unit 16 repetitively executes the reproduction for all the programs described in the delivery list, and when the execution is completed for all the programs, the CPU unit 16 notifies the power control unit 19 that the delivery has been completed as shown in FIG. 6(d).

Upon receipt of the notification, the power control unit 19 shifts the state from step ST4j to step ST4c, in which the unit 19 enters the stand-by mode.

(At the Registration/Delivery Time)

Figure 7:
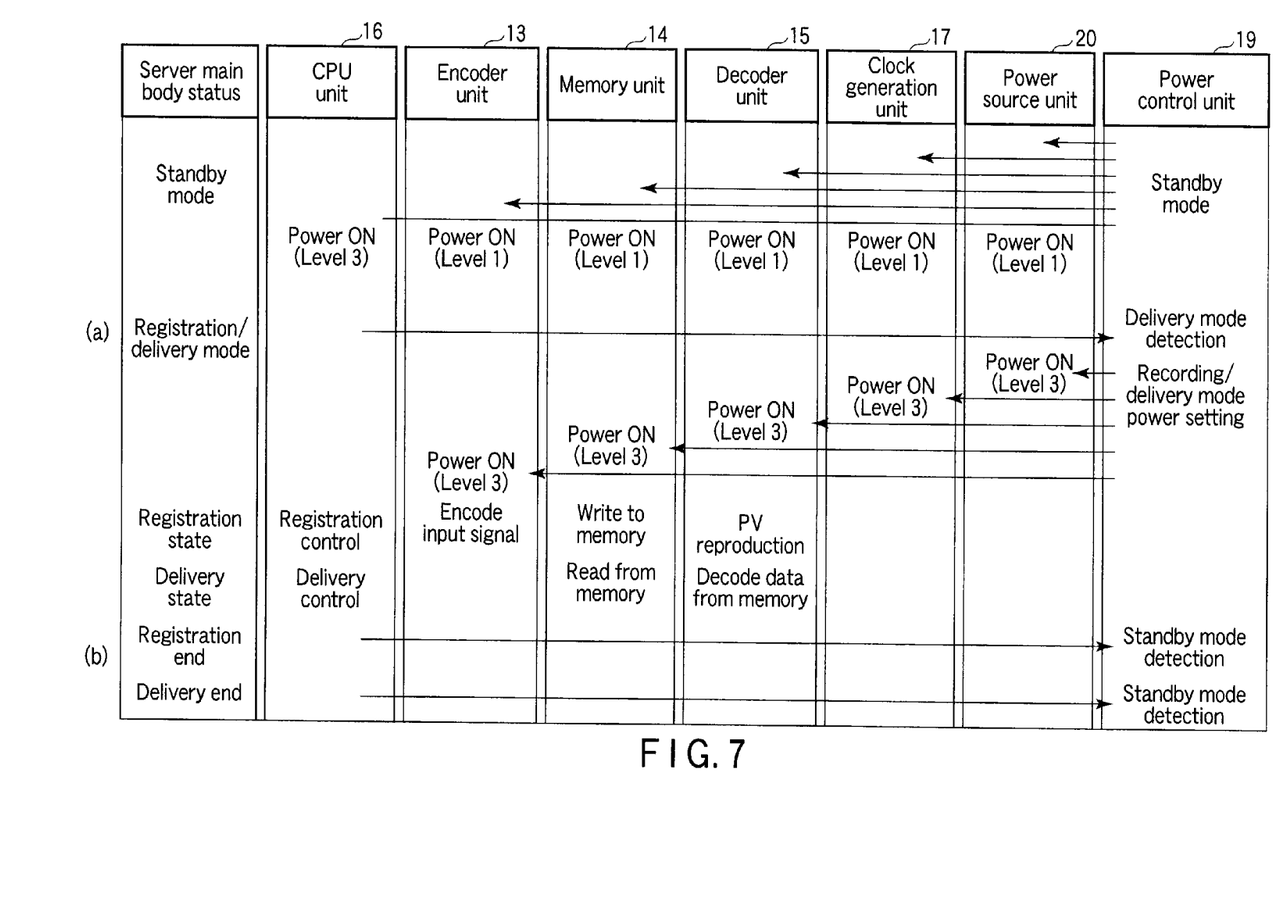
FIG. 7 is a sequence diagram shown to explain an information transmission/reception operation to be carried out between each unit at the time of recording/delivery in the embodiment.

As shown in FIG. 7(a), when the CPU unit 16 receives a recording/delivery list from the host system, the power control unit 19 is notified by the CPU unit 16 through the control bus 12 that recording/delivery is started, whereby the unit 19 determines that recording and delivery are to be simultaneously carried out, and the flow enters the registration/delivery mode. At this time, the encoder unit 13, memory unit 14, decoder unit 15, clock generation unit 17, and power source unit 20 are set at the full-power (Level 3).

At this time, the CPU unit 16 encodes the contents data of all the programs described in the recording/delivery list by using the encoder unit 13, writes the encoded contents data to the memory unit 14, and reads the contents data from the memory unit 14. The CPU unit 16 repetitively executes the recording and delivery for all the programs described in the list, and when the execution is completed for all the programs, the CPU unit 16 notifies the power control unit 19 that the recording and delivery have been completed as shown in FIG. 7(*b*).

Upon receipt of the notification, the power control unit 19 enters the stand-by mode.

(At the Pause Time)

Figure 8:
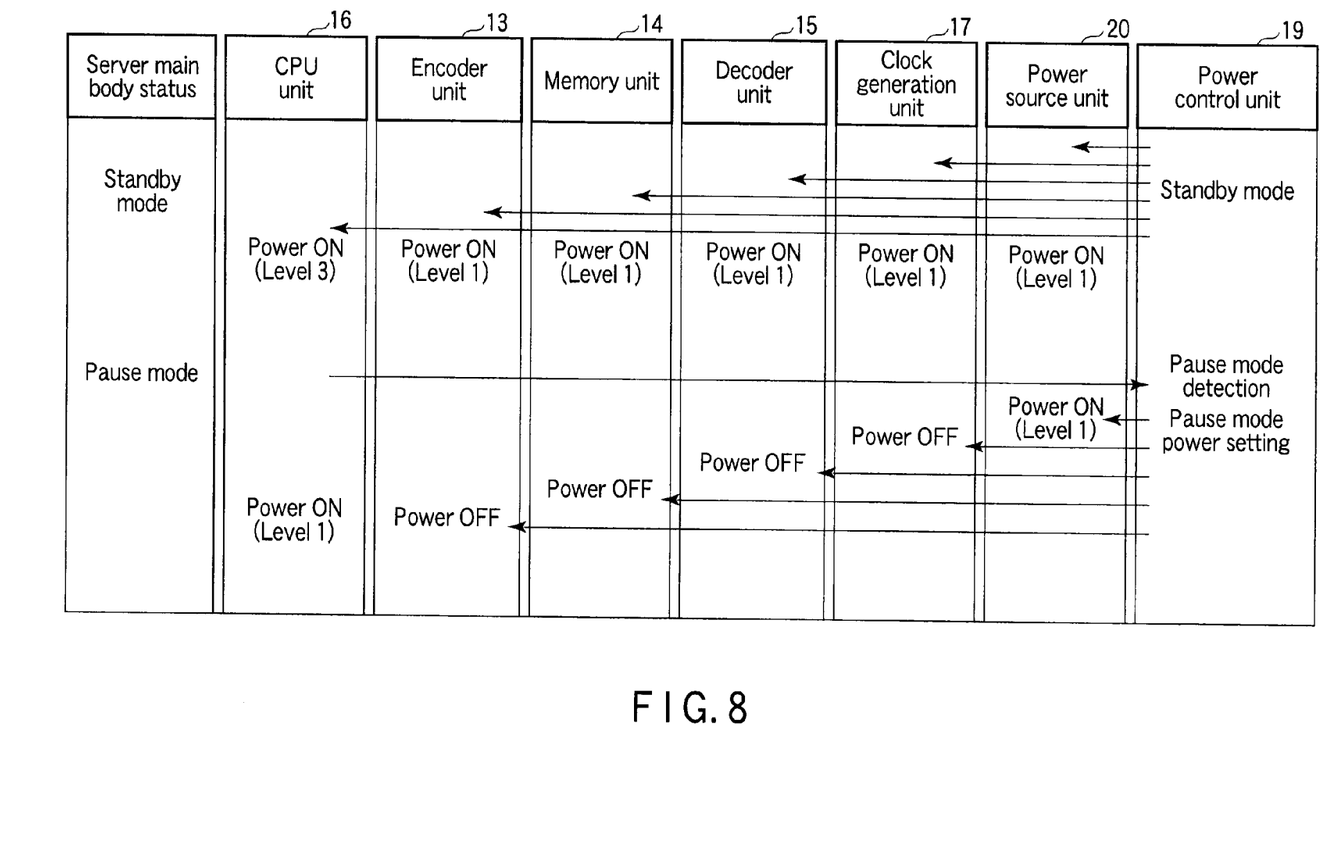
FIG. 8 is a sequence diagram shown to explain an information transmission/reception operation to be carried out between each unit at the pause time in the embodiment.

As shown in FIG. 8, during the execution of the stand-by mode, the power control unit 19 determines whether or not a preset time (for example, five minutes) has elapsed (step ST4*k*), and repetitively executes the processing of step ST4*b* to step ST4*k* until the preset time elapses. Further, when the preset time has elapsed (Yes), the power control unit 19 supplies a message indicating that the unit 19 enters a pause mode to the operation terminal 18 in step ST4*l*, and the message is displayed by on screen display. Accordingly, the operator can learn that the flow enters the pause mode by the display.

In this state, it is assumed that the operator inputs an instruction at the operation terminal 18 in order to put the flow into the pause mode. Then, the power control unit 19 shifts the state from step ST4*m* to step ST4*n*, in which the unit 19 enters the pause mode. The pause mode is a state where the power of the clock generation unit 17 is turned off, and the power source unit 20 is set at Level 1, and only the CPU unit 16 can receive data from the host system.

In the state of the pause mode, the power control unit 19 determines whether or not an event occurs (step ST4*o*), and when no event occurs, the flow is brought into the pause mode as it is. However, when an event associated with recording or delivery occurs (Yes), the flow is shifted to above step ST4*d*. It should be noted that in above step ST4*m*, when the operator does not input an instruction within a predetermined time, the procedure backs to the step ST4*b*.

Figure 9:
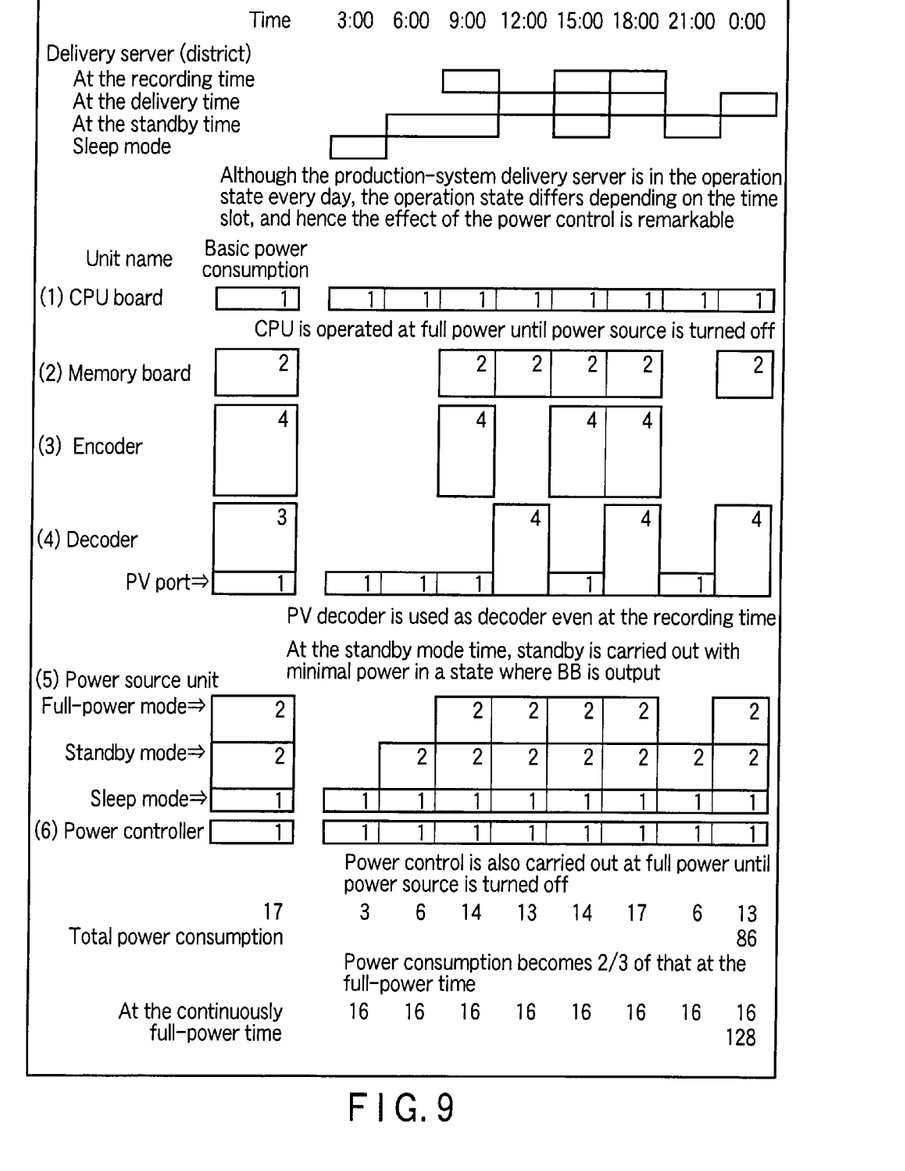
FIG. 9 is a view shown to explain the total power consumption of a case where the embodiment is carried out.

By executing the above power control procedure, the power consumption of the whole video server 1 within 24 hours becomes ⅔ of that at the full-power time as shown in FIG. 9.

As described above, in the embodiment, in the power control unit 19 of the video server 1, it is determined whether or not an event occurs at the time of turning-on of the power, further the power level of each of the encoder unit 13 and decoder unit 15 which make up the greater part of the power consumption is controlled based on the determination result, and hence it is possible to efficiently consume the power.

Further, when the system is not used for a long time such as the middle of the night, the mode is shifted from the stand-by mode to the pause mode, the power of each of the encoder unit 13, memory unit 14, decoder unit 15, and clock generation unit 17 is turned off, and the power level of each of only the CPU unit 16 and power source unit 20 is set at Level 1, whereby it is possible to realize a high degree of lower power consumption, and it is further possible to, when an event occurs, immediately bring the encoder unit 13, memory unit 14, and decoder unit 15 into the stand-by state.

Accordingly, the current-carrying time of the components becomes relatively shorter, and hence the lifetime at the component level is prolonged correspondingly.

Further, in the above embodiment, it is displayed at the operation terminal 18 that the flow is to enter the pause mode, and the pause mode is executed in accordance with the instruction of the operator. As a result of this, the operator does not have to execute the pause mode when there is no need to execute the pause mode at the present time.

Further, in the above embodiment, the power control unit 19 is connected to the encoder unit 13, memory unit 14, decoder unit 15, CPU unit 16, and clock generation unit 17 through the power control bus 21 independent of the data bus 11 and control bus 12, and hence it is possible to execute the signal processing control and power control independently of each other and in parallel with each other, whereby it is possible to securely execute the signal processing control and power control without the influence between them.

It should be noted that in the above embodiment, the operator is once notified that the power control unit is to enter the pause mode before the power control unit enters the pause mode, and when the operator inputs an instruction, the pause mode is executed. However, the processing is not limited to this, the processing may also be configured in such a manner that the mode is automatically shifted from the stand-by mode to the pause mode at the time at which the preset time has elapsed.

Further, the processing of executing the pause mode in accordance with the instruction of the operator, and processing of automatically shifting the mode from the stand-by mode to the pause mode at the time at which the preset time has elapsed may also be selectively carried out in accordance with the selection instruction of the operator from the operation terminal 18.

Further, the power saving function can provide a greater effect as the degree of the multichannel structure is increased, and as the degree of multiplexing of the delivery server is increased. When the operating rate is low, the component lifetime is prolonged, and the power saving mode can also be changed by the operation form.

In the case of the delivery system server, the input/output is often made multichannel, and hence it is also possible to reduce the power consumption by finely turning on/off the power for each port.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recording/reproduction apparatus comprising:
an encoder configured to encode an information signal to generate encoded data, and write the encoded data on a recording medium, to record the information signal;
a decoder configured to read out the encoded data from the recording medium, and to decode the encoded data, to reproduce the information signal;
a plurality of signal processors connected to the encoder and the decoder through an internal bus, and configured to execute signal processing associated with the encoding of the information signal or the decoding of the encoded data;
a process controller connected to the encoder, the decoder, and the plurality of signal processors through the internal bus, and configured to generally control the signal processing of each unit in a unified manner; and
a power source controller configured to control the power level of each of the encoder, the decoder, the recording medium, the plurality of signal processors, and the process controller, wherein
the power source controller comprises:

a determination unit configured to determine whether or not an event associated with at least one of recording and reproduction of the information signal occurs at start-up time;

a stand-by mode execution unit configured to execute a stand-by mode in which the power level of each of the encoder, the decoder, the recording medium, and the plurality of signal processors is controlled to be lower than a predetermined level, when no event occurs as a result of the determination carried out by the determination unit; and a pause mode execution unit configured to execute a pause mode in which the power to each of the encoder, the decoder, the recording medium, and the plurality of signal processors is turned off, and the power level of the process controller is controlled to be lower than the predetermined level, when no event occurs within a preset time during the execution of the stand-by mode;

wherein the pause mode execution unit is further configured to:

notify a user that the pause mode execution unit is to shift to the pause mode when no event occurs within the preset time during the execution of the stand-by mode; and shift to the pause mode when the user inputs an instruction to execute the pause mode in response to the notification.

2. The recording/reproduction apparatus according to claim 1, wherein the power source controller comprises an event process execution unit configured to, control the power level of each of the encoder, the recording medium, and the decoder to be greater than or equal to the predetermined level to execute at least one of recording processing and the reproduction processing, when an event associated with at least one of recording and reproduction of the information signal occurs, and further configured to shift to the stand-by mode after completion of the recording processing or the reproduction processing.

3. The recording/reproduction apparatus according to claim 1, wherein the pause mode execution unit comprises, a first processor configured to notify the user that the first processor is to shift to the pause mode, when no event occurs within the preset time during the execution of the stand-by mode, and shift to the pause mode when the user inputs an instruction to execute the pause mode in response to the notification, a second processor configured to automatically shift to the stand-by mode when no event occurs within the preset time during the execution of the stand-by mode, and a selecting controller configured to selectively initiate execution by the first and second processors in accordance with a designation operation of the user.

4. The recording/reproduction apparatus according to claim 1, wherein the power source control unit is connected to the encoder, the decoder, the recording medium, the plurality of signal processors, and the process controller through a power control bus independent of the internal bus.

5. The recording/reproduction apparatus according to claim 1, wherein the power source controller controls the power level of each of a plurality of input ports and a plurality of output ports, when the encoder contains therein the input ports, and the decoder contains therein the output ports.

6. A video server comprising:

an encoder configured to encode broadcast contents data to generate a encoded data, and write the encoded data on a recording medium, to record broadcast contents data;

a decoder configured to read out the encoded data from the recording medium, and to decode the encoded data into the broadcast contents data;

a plurality of signal processors connected to the encoder and the decoder through an internal bus, and configured to execute signal processing associated with at least one of encoding and decoding of the broadcast contents data;

a process controller connected to the encoder, the decoder, and the plurality of signal processors through the internal bus, and configured to generally control the signal processing of each unit in a unified manner; and a power source controller configured to control the power level of each of the encoder, the decoder, the recording medium, the plurality of signal processors, and the process controller, wherein the power source controller comprises:

a determination unit configured to determine whether or not an event associated with at least one of recording and reproduction of the broadcast contents data occurs at start-up time;

a stand-by mode execution unit configured to execute a stand-by mode in which the power level of each of the encoder, the decoder, the recording medium, and the plurality of signal processors is controlled to be lower than a predetermined level, when no event occurs as a result of the determination carried out by the determination unit; and a pause mode execution unit configured to execute a pause mode in which the power to each of the encoder, the decoder, the recording medium, and the plurality of signal processors is turned off, and the power level of the process controller is controlled to be lower than the predetermined level, when no event occurs within a preset time during the execution of the stand-by mode;

wherein the pause mode execution unit is further configured to:

notify a user that the pause mode execution unit is to shift to the pause mode when no event occurs within the preset time during the execution of the stand-by mode; and shift to the pause mode when the user inputs an instruction to execute the pause mode in response to the notification.

7. A power supply control method of a recording/reproduction apparatus used for a recording/reproduction apparatus comprising an encoder configured to encode an information signal as encoded data, and record the encoded data on a recording medium, a decoder configured to read out the encoded data from the recording medium, and to decode the encoded data into the information signal, a plurality of signal processors connected to the encoder and the decoder through an internal bus, and configured to execute signal processing associated with the encoding or the decoding of the information signal, a process controller connected to the encoder, the decoder, and the plurality of signal processors through the internal bus, and configured to generally control the signal processing of each unit in a unified manner, and a power source control unit configured to control the power level of each of the encoder, the decoder, the recording medium, the plurality of signal processors, and the process controller, comprising:

determining whether or not an event associated with recording or reproduction of the information signal on or from the recording medium occurs at start-up time;

executing, when no event occurs as a result of the determination carried out in the first step, a stand-by mode in which the power level of each of the encoder, the decoder, the recording medium, and the plurality of signal processors is controlled to be lower than a predetermined level;

notifying a user that the power source control unit is to shift to a pause mode when no event occurs within a preset time during the execution of the stand-by mode; and executing, when the user inputs an instruction to execute the pause mode in response to the notification, the pause mode in which the power level of each of the encoder, the decoder, the recording medium, and the plurality of signal processors is rendered off, and the power level of only the process controller is controlled to be lower than the predetermined level.

* * * * *